United States Patent [19]
Takehara et al.

[11] Patent Number: 5,735,510
[45] Date of Patent: Apr. 7, 1998

[54] VIBRATION DAMPER APPARATUS

[75] Inventors: Shin Takehara; Haruyuki Taniguchi; Takahiko Tanaka; Hiroshi Hashino, all of Hiroshima, Japan

[73] Assignee: Mazda Motor Corporation, Hiroshima-ken, Japan

[21] Appl. No.: 462,368

[22] Filed: Jun. 5, 1995

[30]  Foreign Application Priority Data

Jun. 6, 1994 [JP] Japan ..................... 6-123715
May 26, 1995 [JP] Japan ..................... 7-127975

[51] Int. Cl.$^6$ ................ F16F 15/04; B60K 5/12
[52] U.S. Cl. ............ 267/140.13; 188/269; 188/322.21; 267/35; 267/64.28; 267/219
[58] Field of Search .............. 267/140.11, 140.13, 267/140.14, 219, 220, 35, 64.28; 188/322.21, 269, 352; 141/5, 4; 180/300, 312, 902; 248/636, 562, 638

[56]  References Cited

U.S. PATENT DOCUMENTS

| | | | |
|---|---|---|---|
| 4,159,091 | 6/1979 | LeSalver et al. | 267/140.13 |
| 4,277,056 | 7/1981 | Ticks | 267/140.13 |
| 4,641,817 | 2/1987 | Clark et al. | 267/140.13 |
| 4,679,759 | 7/1987 | Ford | 267/140.13 |
| 4,712,777 | 12/1987 | Miller . | |
| 4,817,925 | 4/1989 | Sprang et al. | 188/269 |
| 4,955,588 | 9/1990 | Reuter et al. | 267/219 |
| 5,458,219 | 10/1995 | Anderson | 188/322.21 |

FOREIGN PATENT DOCUMENTS

| | | |
|---|---|---|
| 0258851 | 3/1988 | European Pat. Off. . |
| 0351737 | 1/1990 | European Pat. Off. . |
| 0370524 | 5/1990 | European Pat. Off. . |
| 2631090 | 11/1989 | France . |
| 55-168742 | 5/1979 | Japan . |
| 57-94145 | 6/1982 | Japan ............. 267/140.13 |
| 4282042 | 10/1982 | Japan ............. 188/322.21 |
| 58-88240 | 5/1983 | Japan ............. 267/140.13 |
| 58-203242 | 11/1983 | Japan . |
| 58-221028 | 12/1983 | Japan ............. 267/140.13 |
| 60-65444 | 5/1985 | Japan . |
| 60-237237 | 11/1985 | Japan . |
| 61-084431 | 4/1986 | Japan . |
| 5149368 | 6/1993 | Japan ............. 267/140.13 |

Primary Examiner—Douglas C. Butler
Attorney, Agent, or Firm—Sixbey, Friedman, Leedom & Ferguson, PC; Gerald J. Ferguson, Jr.; Donald R. Studebaker

[57]  ABSTRACT

A fluid type of vibration damper apparatus containing fluid in a rigid fluid container divided by a partition formed with an orifice into two fluid chambers in communication with each other through the orifice, one of the fluid chambers being closed up air-tightly by an elastic top wall to which a subject body of vibration is attached and containing a predetermined quantity of gas so as to be in direct contact with the fluid therein.

20 Claims, 13 Drawing Sheets

5,735,510

VIBRATION DAMPER APPARATUS

BACKGROUND OF THE INVENTION

1. Field of the Invention

The resent invention relates to a vibration damper apparatus and a method of manufacturing thereof.

2. Description of Related Art

Engine mounts for mounting automobile engines on vehicles must perform fundamental functions, such as a supporting function, a vibration absorption and damping function and a engine shake preventive function. These fundamental functions are referred to the effects, respectively, that the engine mount supports statically/dynamically an engine, or a power unit including an engine, mounted on the vehicle so as to prevent mechanical interference of the engine with the vehicle body, that it attenuates and sbsorbs vibrations and noises of the engine so as to prevent vibrations from being transmitted to the vehicle body as much as possible, and that it prevents the engine from shaking so that the vehicle rides smoothly over bumps in a road. Because there are somewhat conflicting requirements that govern the fundamental functions, it is often very hard for these engine mount to perform satisfactorily these fundamental functions all at once. That is, typically, the ideal of such an engine mount is required to have excellent vibration transmitting and vibration damping characteristics with regard to the supporting function, lesser vibration transmitting characteristics with regard to the vibration absorption and damping function, and excellent vibration damping characteristics with regard to the shake preventive function. A rubber type of prior art vibration damper apparatuses used as engine mounting apparatus are designed and adapted so as to have these dynamic characteristics within the limits of compromise.

In the recent years, fluid-contained vibration damper apparatuses are widely used as engine mounting apparatuses. These fluid-contained vibration dampers are classified into three categories or generations specified as below.

First Generation Fluid-Contained Vibration Damper

The first generation of fluid-contained vibration dampers were developed as engine mounting apparatuses for balancing the fundamental functions at a high level as compared with the prior art rubber type of vibration dampers. As shown in FIG. 14, a generally rigid fluid container A1 is divided into two, namely primary and secondary, fluid chambers A2 and A3 by a stiff partition A4 with an opening or orifice A5 formed therein. Vibrations, which are transmitted to an elastic top cover or wall A6, such as a rubber member, from an engine (not shown) through a connecting projection A7 fitted to the engine, or otherwise to an elastic bottom diaphragm A8 attached to the vehicle body (not shown) through a bottom member A9, compels the contained fluid to move between the primary and secondary fluid chambers A2 and A3 through the orifice A5. By means of resonant vibration of the fluid in the orifice A5, the fluid-contained vibration damper of this first generation enhances the damping characteristic for vibrations in a specific range of low frequencies and, however, diminishing the transmission characteristic for vibrations in a range of high frequencies through the vibration damper.

Assuming that a force F acts on the bottom member A9 when the elastic top wall A6 causes a deflection of X, the degree of vibration transmission Kt and the degree of vibration attenuation Td are given as functions of vibration frequency as follows:

$$Kt = |F/x|$$

$$Td = Im(F/x)/Re(F/x) \sim Tan\ \delta$$

The degree of vibration transmission Kt and the degree of vibration attenuation Td are shown by graphs in FIGS. 15 and 16, respectively. In FIGS. 15 and 16, broken lines indicate vibration transmissibility Kt and the degree of vibration attenuation Td of the prior art rubber vibration damper. As proven in FIGS. 15 and 16, the fluid-contained vibration damper shows considerably improved the degree of vibration transmission Kt and the degree of vibration attenuation Td as compared with the prior art rubber vibration damper.

However, for the fluid-contained vibration damper of this first generation, the elastic top wall A6, such as a rubber member, is required to have somewhat conflicting physical properties, such as rigidity sufficient to support an engine and flexibility sufficient to allow expansion of the fluid chamber. In order for the fluid-contained vibration damper to show the most of vibration attenuation characteristic, it is effective to locate the elastic top wall A6 in a position where it receives a large load. In such a case, the elastic top wall A6 must have high rigidity and consequently, the fluid chamber A1 looses steadiness in shape. This causes an enhanced degree of vibration transmission which provides adverse effects to vibrations and noises and a rise in vibration frequency for the maximized degree of vibration attenuation which leads to aggravation of effective engine vibration control.

Second Generation Fluid-Contained Vibration Damper

The second generation of fluid-contained vibration dampers were improved as engine mounting apparatuses so as to eliminate the drawbacks involved in the first generation of fluid-contained vibration dampers. As shown in FIG. 17, in order for the fluid-contained vibration damper to reduce the steadiness of a primary fluid chamber B2 against expansion, a generally rigid partition B4 is provided with an elastic member, such as an elastic rubber membrane B10, so as to be partly flexible. As apparent from FIG. 18, the second generation of fluid-contained vibration damper shows the degree of vibration transmission diminished for vibrations in a range of high frequencies as compared with that of the first generation, reducing the transmission of vibrations and noises to the vehicle body.

Third Generation Fluid-contained Vibration Damper

The third generation of fluid-contained vibration dampers were improved as engine mounting apparatuses so as to diminish the degree of vibration transmission for vibrations in a specific range of frequencies as compared with the second generation of fluid-contained vibration dampers. Conventionally, in order to control noises and vibrations which the vehicle bodies generate are distinctive in a specific range of vibration frequencies due to resonant vibrations between the vehicle body and engine brackets, it was popular to use dynamic dampers. As shown in FIG. 19, the third generation of fluid-contained vibration damper is almost the same in structure as the second generation of fluid-contained vibration damper excepting that a parabolic canopy C11 is provided. This parabolic canopy C11 serves to reduce the degree of vibration transmission Kt for vibrations in a specific range of frequencies so as to keep the vehicle as quiet as possible. As apparent from FIG. 20, the third generation of fluid-contained vibration damper shows the degree of vibration transmission diminished for vibrations in the specific range of high frequencies as compared with that of the second generation, reducing the transmission of, in particular, noises to the vehicle body.

One of prior art vibration damper apparatuses used as engine mounting apparatuses is that described in Japanese Unexamined Utility Model Publication No. 60-65444. The vibration damper apparatus includes a hollow cylindrical rubber body as a vibration damper which is disposed between an upper plate attached to an engine and a lower plate attached to a chassis of the vehicle. This vibration damping rubber body forms therein first and second fluid chambers divided by a partition with an orifice. In the first fluid chamber, there is provided a subordinate partition with a small orifice so as to form an air chamber above the first fluid chamber for accumulation of fluid and air therein. This vibration damping rubber body prevents aggravation of vibration attenuation in a range of low vibration frequencies due to the air accumulated on the top of the fluid in the first fluid chamber and provides certainly a spring constant sufficiently low for vibrations in a range of high frequencies, yielding absorption of vibrations at high frequencies and attenuation of vibrations at low frequencies.

Another example of such prior art vibration damper apparatus is that described in Japanese Unexamined Utility Model Publication No. 54-067971. The vibration damper apparatus includes a pair of cylindrical hollow members, opened at one ends and closed at the other ends, and a joint member as a partition by means of which these hollow cylindrical members are joined at the open ends together so as to form two closed chambers. These chambers are communicated with each other by means of a small opening or orifice formed in the joint member. In one of the chambers, there is contained fluid less in amount than the cubic capacity of the chamber. On the other hand, another one of the chambers is filled with an inert gas. With the vibration damper apparatus thus structured, if vibrations have small amplitudes, external force acting on the fluid compresses the inert gas so as thereby to be absorbed. On the other hand, if vibrations have large amplitudes, they force the fluid to flow into the gas contained chamber through the orifice of the partition. This displacement of fluid consumes energy, causing attenuation of the vibrations. In such a way, the vibration damper apparatus functions likely as an air suspension and yields improved vibration attenuation.

As described in Japanese Unexamined Patent Publication No. 59-166737, a vibration damper apparatus has a pair of elastic fluid chambers disposed at opposite sides of a partition so as to be in communication with each other through an orifice formed in the partition. Either one of the elastic fluid chambers is provided with a stopper which is brought into abutment against a flange of another elastic fluid chamber upon an occurrence of a predetermined amount of deflection of the one elastic fluid chamber, so as to be coupled to the other elastic fluid chamber together. The joined elastic fluid chambers yields a large spring constant, the vibration damper apparatus exhibits the high characteristics of attenuation for vibrations at low frequencies. For vibrations at high frequencies, the stopper does not strike the flange, so as to remain the spring constant of the one elastic fluid chamber to be still small, thereby keeping the vibration damper apparatus attenuate less vibrations.

Further, as described in Japanese Unexamined Patent Publication No. 60-139507, in order to improve the degree of freedom of setting the frequency at which vibrations are well isolated due to fluid resonance, a cylindrical bush type of vibration damper apparatus has been proposed. This cylindrical bush includes outer and inner hollow cylindrical tubes disposed coaxially and an elastic member between these outer and inner hollow cylindrical tubes. Two fluid chambers, formed in the elastic member, are communicated with each other by means of a suspension arm through which the cylindrical bush vibration damper apparatus is attached to the vehicle body. A gas is confined in either one of the fluid chamber. With the cylindrical bush vibration damper apparatus, changes in pressure of the fluid in the fluid chambers are allowed due to compression of the gas, enabling the spring constant of the fluid in the fluid chamber to change according to vibrations transmitted to the cylindrical bush vibration damper apparatus.

According to another example of a vibration damper apparatus described in Japanese Unexamined Utility Model Publication No. 4-97136, two fluid chambers enclosed by an elastic rubber walls which are in communication with each other by means of an orifice formed in a partition. Between an engine and one of the fluid chambers to which the engine is attached, there is formed an air chamber separated from the fluid chamber by an elastic rubber membrane. The elastic rubber membrane is configured so as to have a diameter of ¼ to ⅓ of the diameter of the cross-sectional area of the fluid chamber and, together, a shore hardness larger than the wall of another fluid chamber. With the vibration damper apparatus, a high degree of attenuation is effected by the orifice for vibrations in a range of low frequencies and, on the other hand, the degree of vibration transmission is reduced for vibrations in a range of high frequencies due to a reduced steadiness of the fluid chamber through the air chamber, so that an reliable vibration control function is performed over an entire range of vibration frequencies.

While the vibration damper apparatuses as described in the above publications may have various advantages over the prior art, nevertheless, various constraints must be imposed on their costs, functions, structures and sizes. For example, the vibration damper apparatuses of, in particular the second and third generations need special parts, such as a stiff partition formed partly with an elastic rubber membrane and a canopy, which increase costs of the apparatuses.

The vibration damper apparatus, described in Japanese Unexamined Utility Model Publication No. 60-65444, is provided with a subordinate orifice for eliminating effects of mixed air in the fluid. The air chamber is formed in cooperation with the subordinate orifice so as to accumulate the residual air. The vibration damper apparatus thus structured has the problem that, in a range of vibration frequencies where noises are brought into issue, a fluid column in the subordinate orifice is at frequencies higher than a resonant frequency, i.e. in the state what is called clogging, so that the residual air is almost never contributory to noise reduction.

Further, the vibration damper apparatus described in Japanese Unexamined Patent Publication No. 59-166737 which utilizes an inert gas as a substitution for the diaphragm in the prior art vibration damper apparatus is bulky because of the air chamber provided as an additional part to the elastic fluid chamber.

In the vibration damper apparatus described in Japanese Unexamined Patent Publication No. 60-139507 which comprises an integral cylinder-shaped bush with more-than-two fluid chambers defined by the elastic members functioning as springs, if only either one of the fluid chambers contains a gas, the elastic member has a spring constant increased in excess in the event the orifice is clogged, incapacitating the vibration damper apparatus for sufficient vibration attenuation. In order for the vibration damper apparatus to overcome the drawback, while it is thought to reduce spring constants for both fluid chambers, nevertheless, hard constraints must be imposed on the structure of integral cylinder-shaped bush. In addition, it is also thought to contain a gas in another fluid chamber. In the vibration damper apparatus, however, the gas in the one fluid chamber possibly penetrates into the other fluid chamber through the orifice during assembling the vibration damper apparatus to a vehicle, or due to shaking itself. In such an event, the vibration damper apparatus is incapacitated for vibration attenuation. Together, it is hard to care the gas contained in the vibration damper apparatus.

With the vibration damper apparatus described in Japanese Unexamined Patent Publication No. 54-067971 which employs a pair of elastic cylindrical chambers, high frequency vibrations having small amplitudes can be absorbed due to contraction of the gas and low frequency vibrations having large amplitudes can be absorbed due to expansion and contraction of the elastic cylindrical chambers. While, if the elastic cylindrical chambers have large spring constants, the vibration damper apparatus can prevent the engine from shaking when vibrations have large amplitudes and high frequencies, nevertheless, expansion and contraction of the elastic cylindrical chambers is aggravated, it becomes difficult to absorb vibrations having large amplitudes. Contrary, if the elastic cylindrical chambers have small spring constants, deflection of the elastic cylindrical chambers are large, causing the vibration damper apparatus to be less sensitive to high frequency vibrations. Further, since the attenuation characteristics of the vibration damper apparatus is governed by configurations of the elastic cylindrical chambers, tuning according to models of vehicles is difficult.

The teaching of Japanese Unexamined Utility Model Publication No. 4-97136 alludes to set a spring constant higher for the elastic rubber membrane than for the second chamber wall which seems to serve as a diaphragm. However, it is very difficult to determine the spring constant of the elastic rubber membrane in consideration of the compression characteristics of the gas in the gas chamber so as to reduce the stiffness of the fluid chamber adjacent to the engine. This is because the pressure of a gas confined in the gas chamber is one of essential factors for determining the spring constant of the elastic rubber membrane and has a direct effect to the stiffness of the fluid chamber. For instance, if it is required for the vibration damper apparatus to have a high degree of vibration attenuation and a low degree of vibration transmission with an elastic rubber membrane having a small spring constant, it is necessary to confine a gas at a high pressure. However, in the case where elastic rubber membranes having small spring constants are used, the vibration damper apparatus is short-lived due to inferiority in strength and durability of the elastic rubber membrane. On the other hand, if using an elastic rubber membrane having a large spring constant in an attempt to provide a high degree of vibration attenuation and a low degree of vibration transmission, the elastic rubber membrane functions only as a rubber member, loosing the effect of a gas confined in the chamber. Together, since the configuration of an elastic rubber membrane depends upon the pressure of confined gas, it is very difficult to find an appropriate spring constant in consideration of deformation of the elastic rubber membrane. In addition, changes in the spring constant are caused with the lapse of time due to deterioration of the elastic rubber membrane resulting from repeated expansion and contraction, leading to changes in the characteristics of the vibration damper apparatus.

The vibration damper apparatus described above needs a sealing member for providing sufficiently air-tight interface between the air chamber and the elastic rubber membrane during manufacturing, leading to increased costs.

SUMMARY OF THE INVENTION

It is an object of the present invention to provide a vibration damper apparatus used as an engine mounting apparatus which is free from annoying operations in designing the spring constant and deterioration in performance due to aging.

It is another object of the present invention to provide a vibration damper apparatus used as an engine mounting apparatus which can reduce the number of parts and costs thereof.

The above objects of the present invention is achieved by providing a fluid type of vibration damper apparatus for absorption and attenuation of vibrations to be transmitted to a vehicle body from a subject body such as an engine, which contains fluid in a rigid fluid container closed up air-tightly by walls including at least an elastic top wall to which the subject body is attached. The vibration damper apparatus comprises a partition wall which divides the fluid container into a first fluid chamber defined by at least the elastic top wall and a second fluid chambers. These first and second fluid chambers are in communication with each other through an orifice of the partition so as to allow the fluid to move therebetween due to deformation of the elastic top wall. In the first fluid chamber contains a predetermined quantity of gas so as to be in direct contact with the fluid.

The fluid type of vibration damper apparatus may be provided with a third fluid chamber opening to the first fluid chamber so as to provide a fluid column directly on the top of the fluid in the first fluid chamber. The gas is confined so as to be in direct contact with the fluid column in the third fluid chamber.

In confining the gas in the vibration damper apparatus of the present invention, after closing up the fluid container air-tightly, fluid is injected into the fluid container. Subsequently, after degassing the fluid in the fluid container, a predetermined amount of the gas, such as air and an inert gas, is injected and confined in the fluid container. The amount of gas is predetermined to be necessary to absorb or attenuate vibrations in a predetermined range of high frequencies. Finally, the vibration damper apparatus is contracted and sealed so as to be placed under internal pressure.

The vibration damper apparatus used as an engine mounting apparatus of the present invention, in which a predetermined amount of gas is simply confined in the fluid container, makes it free from annoying operations to design the spring constant and avoids deterioration in performance due to aging and, in addition, reduces the number of parts and costs thereof. The third fluid chamber provided for the gas may be is defined by a hollow cylindrical member embedded in the elastic top wall. The cylindrical member serves as a lining means for covering the elastic top wall air tightly, so as to prevent the gas from escaping through the elastic top wall and thereby to maintain it steady in quantity. In addition, the cylindrical member serves as a reinforcement for a portion of the elastic top wall through which vibrations are transmitted to the vibration damper apparatus. Using air as the gas lowers costs of the vibration damper apparatus. Using air or an inert gas which is hardly soluble in fluid maintains the performance of the vibration damper apparatus.

Confining a predetermined quantity of gas which is determined so as to reduce the degree of transmission of vibrations at frequencies higher than a predetermined frequency of the subject body eliminates the use of an elastic rubber membrane which is essential in the prior art vibration damper apparatus.

The vibration damper apparatus may have a fluid container with an elastic bottom wall. Each of the elastic top wall and the elastic bottom wall is deformable so as to function as a spring responding to changes in internal pressure in the fluid container, the elastic top wall having an equivalent spring constant larger than the elastic bottom wall. This configuration of vibration damper apparatus provides a reduction in the degree of vibration transmission and an increase in the degree of vibration attenuation.

Because the third chamber provides a fluid column as a direct part of the fluid in the first fluid chamber, it enables the fluid column to resonate responding to vibrations in a specific range of frequencies, increasing the degree of vibration transmission. Furthermore, by providing a resonant frequency for the fluid column in the third fluid chamber larger than for the fluid in the orifice, the fluid column in the third fluid chamber functions as a high frequency air device which absorbs vibrations in a specific range of high frequencies.

The partition may comprise an outer hollow cylindrical wall and an inner hollow cylindrical wall so as to provide a second fluid chamber therebetween and a third fluid chamber within the inner hollow cylindrical wall. In the vibration damper apparatus thus structured, a gas is confined in both second and third fluid chambers which are in communication with each other through an air orifice. The gas in the third fluid chamber performs the function of restraining contraction of the first fluid chamber due to deformation of the elastic top wall, so that the vibration damper apparatus yields a reduction in the degree of transmission of vibrations at high and low frequencies. Together, the gas and fluid in the third fluid chamber functions as an air device and resonates responding to vibrations in a specific range of high frequencies. The third fluid chamber is configured so as to cause resonant vibrations of the column of gas and fluid at a frequency larger than a frequency at which the fluid column in the orifice so that the vibration damper apparatus yields a reduction in the degree of transmission of vibrations in the specific range of high frequencies. Because the gas moves between the second fluid chamber and the third fluid chamber so as to develop uniform distribution of pressure over the fluid, it functions as a sort of flexible diaphragm.

With the method of confining a gas in the vibration damper apparatus, the process of manufacturing the vibration damper apparatus is simplified and enables the vibration damper apparatuses to be free from wide variations in static and dynamic characteristics.

BRIEF DESCRIPTION OF THE DRAWINGS

The above and other objects and features of the present invention will be clearly understood from the following description with respect to a preferred embodiment thereof when considered in conjunction with the accompanying drawings, in which same reference numerals having used therein denote the same or similar parts or elements throughout the drawings and wherein.

DETAILED DESCRIPTION OF THE PREFERRED EMBODIMENTS

Figure 1A:
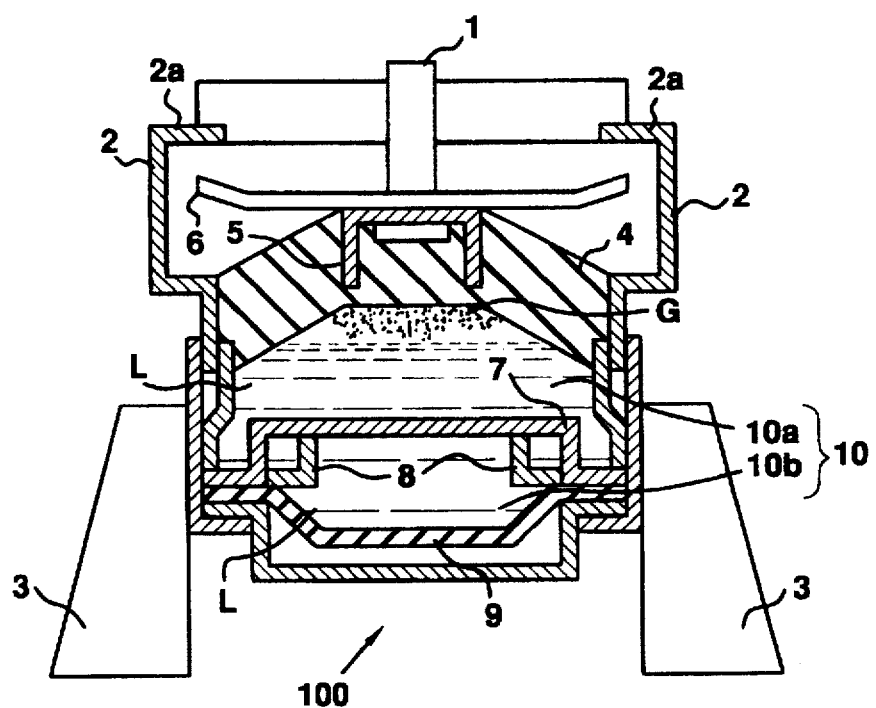
FIG. 1A is a cross-sectional view of a vibration damper apparatus used as an engine mounting apparatus in accordance with a preferred embodiment of the present invention.
Figure 1B:
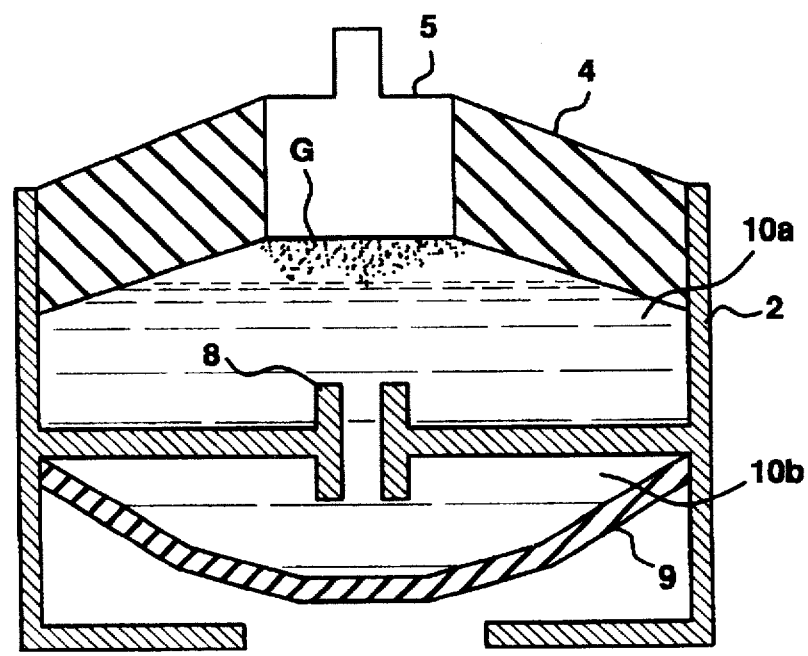
FIG. 1B is a schematic illustration showing a simplified model of the vibration damper apparatus of FIG. 1A.

Referring now to the drawings in detail, and in particular, to FIGS. 1A and 1B, a fluid type of vibration damper apparatus 100 used as an engine mounting apparatus according to a preferred embodiment of the present invention is shown. The vibration damper apparatus 100 comprises an engine connecting rod member 1 by which the vibration damper apparatus 100 is attached to a subject body (not shown) which generates vibrations, such as an engine, a generally cylindrically-shaped, rigid fluid container 2 and a vehicle body connecting member 3 through which the vibration damper apparatus 100 is attached to a chassis of the vehicle body (not shown). In this instance, these members 1-3 form an external shape of the vibration damper apparatus 100. The engine connecting rod member 1 is bolted, or otherwise secured, at its one end to the engine and secured at its another end to a disk-like or canopy-shaped elastic rubber pad 4 by a fitting 5. A disk-shaped stopper member 6 is secured to the top of the elastic rubber pad 4. The cylindrical fluid container 2 is formed with an annular flange 2a extending laterally inward from its another end so as to define a top opening. The elastic rubber pad 4 is fitted in and secured to the cylindrical fluid container 2 so as to form a fluid chamber 10 in which fluid L is confined and is deformable due to changes in pressure of the fluid L in the fluid container 2. Because of such deformation, the elastic rubber pad 4 functions as a "spring." This fluid chamber 10 is divided by means of a partition 7 into two fluid chambers, namely a first fluid chamber 10a defined by the elastic rubber pad as a top wall adjacent to the subject body and a second fluid chamber 10b remote from the subject body with respect to the first fluid chamber 10a. In this instance, a predetermined amount, for instance approximately 1 to 3 cc, of an inert gas G having no chemical reaction on the elastic rubber pad 4, such as a helium gas and air, is forcibly confined within the first fluid chamber 10a so as to be in direct contact with the fluid L. This partition 7 is provided with a fluid path, serving as an orifice 8, defined by a spiral wall for fluid communication between these first and second fluid chambers 10a and 10b. The vibration damper apparatus 100 has a dome-shaped elastic diaphragm 9 provided between the partition 7 and the bottom of the fluid container 2 so as to form a bottom wall of the second fluid chamber 10b. This bottom diaphragm 9 is capable of expanding and contracting due to changes in hydraulic pressure in the fluid container 2. It is to be understood that the gas G may be of any kind which is hardly soluble in the fluid L and the confined amount of the gas G may vary according to types and/or weight of subject bodies, such as engines. If the elastic rubber pad 4 causes upward deformation beyond a predetermined level due to vibrations transmitted thereto, the stopper 6 is brought into abutment against the flange 2a, restricting the deformation of the elastic rubber pad 4.

Vibration Transmitting Characteristics

It is essential for the elastic rubber pad 4 to have a fundamental function of substantially supporting the subject engine thereon and absorbing vibrations generated by the subject engine and the vehicle body chassis. For this reason, the elastic rubber pad 4 has elasticity, which is otherwise referred to as a spring constant, lesser or smaller than the bottom diaphragm 9. In general, as was previously described, with an increase in the supporting stiffness of an engine mount, the engine mount yields a decline in the expansible stiffness of a fluid chamber which in turn indicates the degree of facility in expansion of the fluid chamber. Such a decline in the expansible stiffness provides an increase in the degree of vibration transmission, leading to aggravation of vibration control and rendering the engine mount easy to transmit engine vibrations. In order for the vibration damper apparatus 100 to have a reduced expansible stiffness, the gas G is confined in the first fluid chamber 10a so as to be in direct contact with the fluid L. The gas G performs the function of restraining deformation of the elastic rubber pad 4, and hence expansion and contraction of the first fluid chamber 10a, due to the compression characteristics, so that the vibration damper apparatus 100 yields a reduction in the degree of transmission of vibrations in both ranges of high and low frequencies.

Vibration Attenuation

Due to deformation of the elastic rubber pad 4 caused by vibrations in the range of low frequencies, the fluid L moves between the first and second fluid chambers 10a and 10b through the spiral orifice 8. If vibrations are in a specific range of frequencies, the fluid L causes a resonant vibration, blocking the spiral orifice 8. That is, the resonant vibration of the fluid yields an enhanced attenuation of vibrations in the specific range of frequencies. However, as is well known, as the degree of vibration transmission is enhanced, the frequency for which the vibration damper apparatus 100 provides the greatest degree of vibration attenuation tends to become high, adversely affecting the vibration control function of the vibration damper apparatus 100. The gas G confined in the first fluid chamber 10a also performs to diminish the degree of transmission of vibrations in a specific range of low frequencies, i.e. to reduce the expansive stiffness of the first fluid chamber 10a, so as thereby to yield an enhanced degree of vibration attenuation and improve the vibration control function of the vibration damper apparatus 100.

Figure 2A:
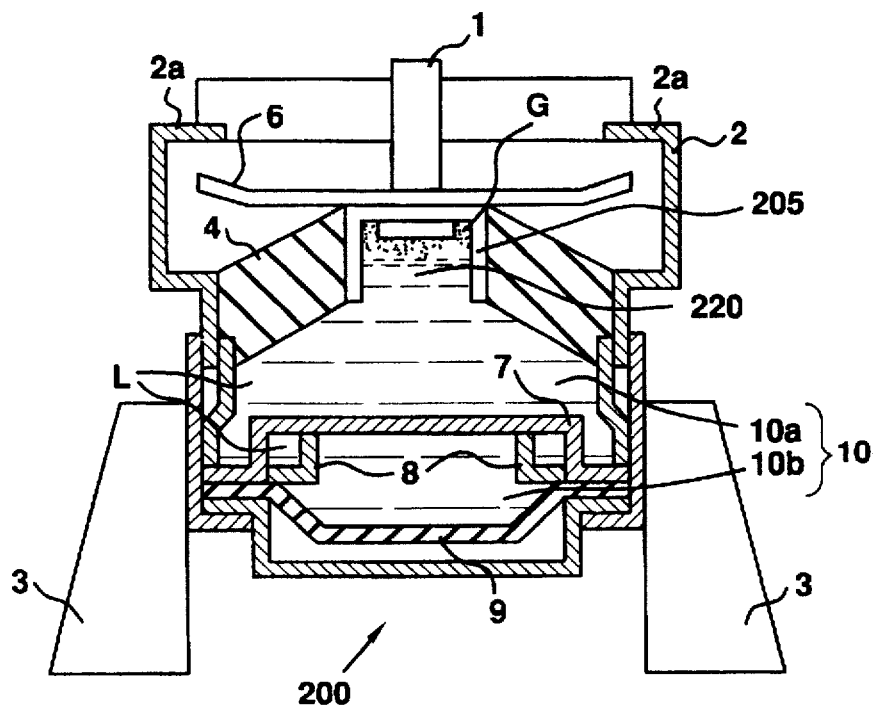
FIG. 2A is a cross-sectional view of a vibration damper apparatus in accordance with another preferred embodiment of the present invention.
Figure 2B:
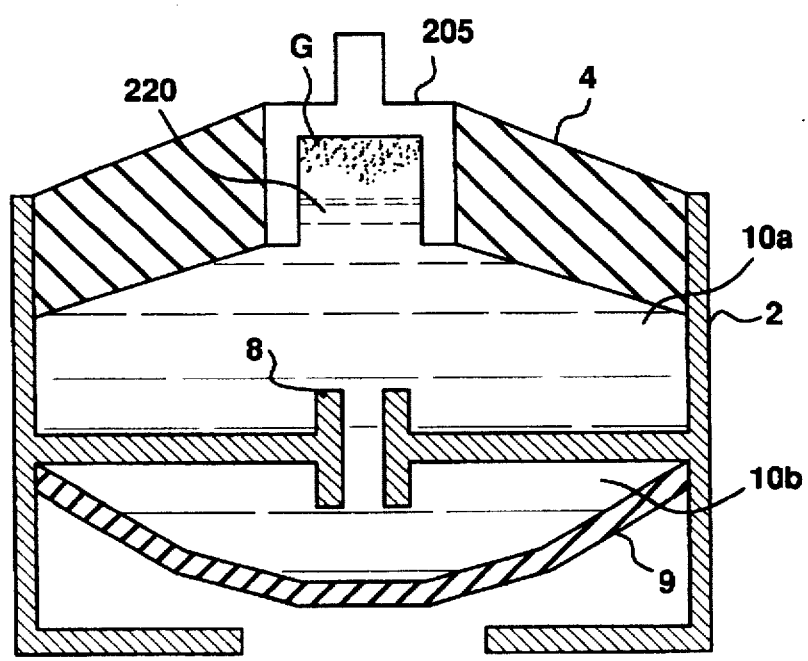
FIG. 2B is a schematic illustration showing a simplified model of the vibration damper apparatus of FIG. 2A.

FIGS. 2A and 2B show a fluid type of vibration damper apparatus 200, used as an engine mounting apparatus, according to another preferred embodiment of the present invention. This vibration damper apparatus 200 is almost similar in structure to that of the previous embodiment, excepting only the difference in configuration of an first fluid chamber 10a. Specifically, an elastic rubber pad 4 is formed therein with a third fluid chamber 220 which in turn provides a fluid column on the top of the fluid in the first fluid chamber 10a. The third fluid chamber 220 is defined by a cylindrical cap-shaped fitting 205. This cap-shaped fitting 205 with its opening faced downward is fitted into the elastic rubber pad 4 and bolted, or otherwise secured, to an engine connecting rod member 1. This third fluid chamber 220 is configured so as to be larger in cross-sectional area than an orifice 8 but smaller than the first fluid chamber 10a. An inert gas G having no chemical reaction on the elastic rubber pad 4, such as a helium gas, is forcibly confined within the third fluid chamber 220 so as to be in direct contact with the fluid column. The column of gas G and fluid L in the third fluid chamber 220 functions as a sort of air device in which resonant vibrations of the fluid column occur.

The cap-shaped fitting 205 has the effect that it prevents the gas G from escaping through the elastic rubber pad 4 which tends to become porous with the lapse of time.

Vibration Transmissibility

The gas G at the head of the fluid column in the third fluid chamber 220 performs, due to its own compression characteristic, the function of reducing the expansive stiffness of the first fluid chamber 10a resulting from deformation of the elastic rubber pad 4, so that the vibration damper apparatus 100 yields a reduction in the degree of transmission of vibrations in both ranges of high and low frequencies. Together, the column of gas G and fluid L in the third fluid chamber 220, which functions as an air device, serves as a substitutive device for dynamic dampers conventionally used to control noises and vibrations which are distinctive in a specific range of frequencies due to a resonant vibration of the vehicle body and engine brackets. Specifically, the column of gas G and fluid L in the third fluid chamber 220 causes resonant vibrations responding to vibrations in a specific range of high frequencies. The third fluid chamber 220 is configured so as to cause resonant vibrations of the column of gas G and fluid L at a frequency larger than a frequency at which a fluid column in the orifice 8 causes resonant vibrations. The vibration damper apparatus 200 thus structured yields a reduction in the degree of transmission of vibrations in the specific range of high frequencies.

Vibration Attenuation

Because the gas G confined in the third fluid chamber 220 also performs so as to diminish the degree of transmission of vibrations in a specific range of low frequencies, i.e. to reduce the expansive stiffness of the first fluid chamber 10a, the vibration damper apparatus 200 yields an enhanced degree of vibration attenuation and, consequently, improves the vibration control function.

Figure 3A:
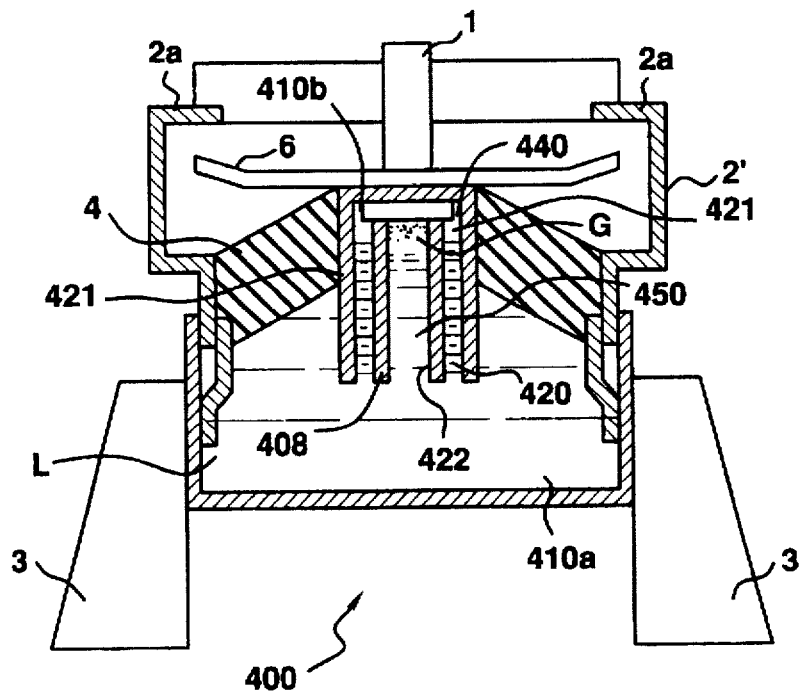
FIG. 3A is a cross-sectional view of a vibration damper apparatus in accordance with still another preferred embodiment of the present invention.
Figure 3B:
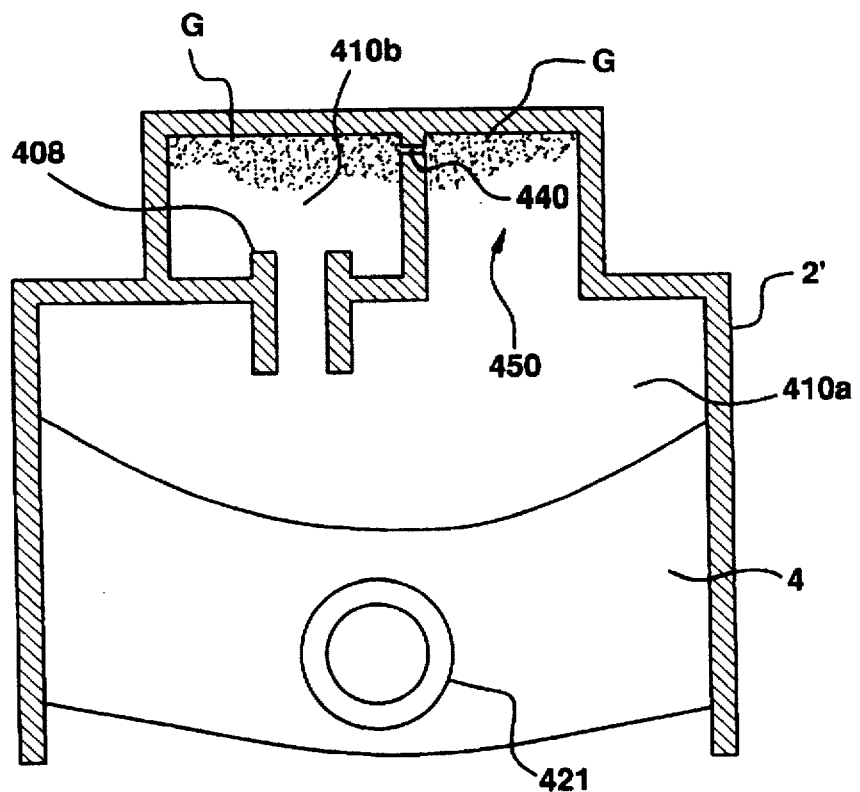
FIG. 3B is a schematic illustration showing a simplified model of the vibration damper apparatus of FIG. 3A.
Figure 3C:
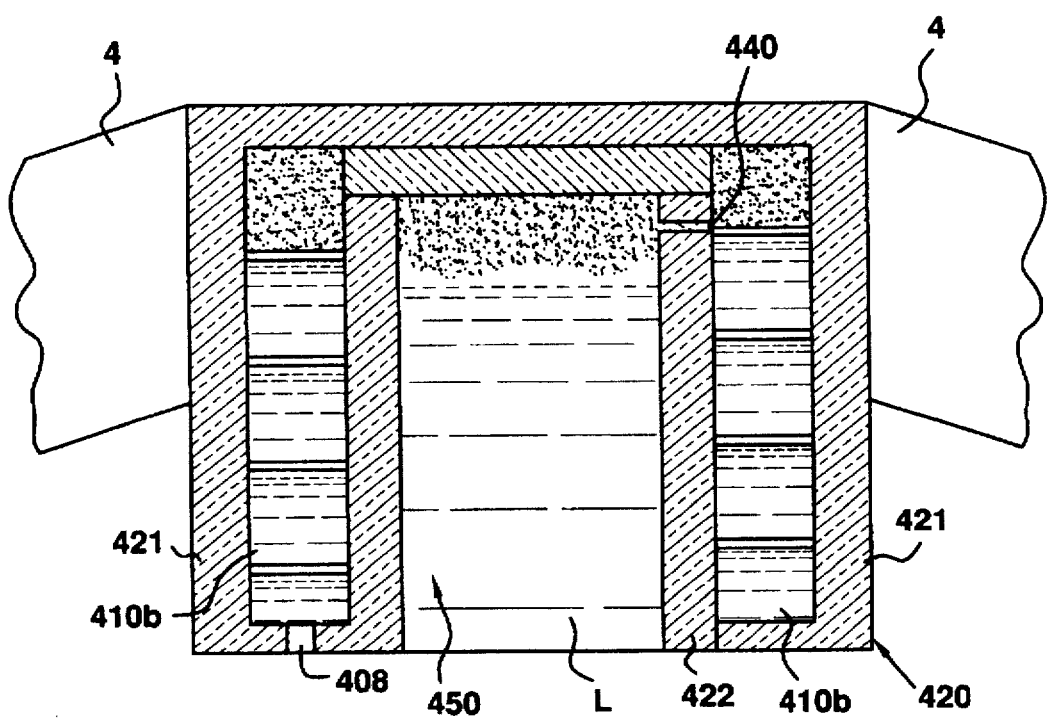
FIG. 3C is an enlarged view of second and third fluid chambers.

FIGS. 3A and 3B show a fluid type of vibration damper apparatus 400 used as an engine mounting apparatus according to another preferred embodiment of the present invention. The vibration damper apparatus 400 comprises an engine connecting rod member 1 by which the vibration damper apparatus 400 is attached to a subject body, such as an engine (not shown), a generally cylindrically-shaped, rigid fluid container 2' and a vehicle body connecting member 3 by which the vibration damper apparatus 400 is attached to a chassis of the vehicle body (not shown). The engine connecting rod member 1 is bolted, or otherwise secured, at its one end to the engine and secured at its another end to a disk-like or canopy-shaped elastic rubber pad 4. The engine connecting member 1 further supports at the other end a disk-shaped stopper member 6 secured to there to right above the top of the elastic rubber pad 4. The cylindrical rigid fluid container 2' is formed with an annular flange 2a extending laterally inward from its another end so as to define a top opening. The elastic rubber pad 4 is fitted in and secured to the cylindrical fluid container 2' and is, however, deformable due to changes in pressure of fluid L contained in the cylindrical fluid container 2'. The cylindrical fluid container 2' is divided into two chambers, namely a first fluid chamber 410 and a second fluid chamber 410b having an annular cross section, by means of a double walled cylindrical partition 420 fitted into and secured to the elastic rubber pad 4. In more detail, the double walled cylindrical partition 420 comprises an outer cylindrical wall 421 and an inner cylindrical wall 422 between which the second fluid chamber 410b is defined. These first and second fluid chambers 410a and 410b are in communication with an orifice 408. The inner cylindrical wall 422 defines therein a third fluid chamber 450 in which a fluid column is formed on the top of fluid L in the first fluid chamber 410a. An inert gas G, such as a helium gas and air, is forcibly confined on the top of a fluid column in the second fluid chamber 410b and on the top of a fluid column in the third fluid chamber 450. The inner cylindrical wall 422 is provided with an air orifice 440 for communication between these second and third fluid chambers 410b and 450. In this instance, the vibration damper apparatus 400 is not provided with a diaphragm in the second fluid chamber or in anywhere else.

The column of gas G and fluid L in the third fluid chamber 450 functions as a sort of resonant device or air device. The air orifice 440 enables the gas G to be distributed uniformly in the second and third fluid chambers 410b and 450.

Vibration Transmissibility

The gas G at the head of the fluid column in the third fluid chamber 450 performs the function of restraining contraction of the first fluid chamber 410a due to deformation of the elastic rubber pad 4, so that the vibration damper apparatus 400 yields a reduction in the degree of transmission of vibrations in both ranges of high and low frequencies. Together, the gas G and fluid L in the third fluid chamber 450 functioning as an air device resonates responding to vibrations in a specific range of high frequencies. The third fluid chamber 450 is configured so as to cause resonant vibrations of the column of gas G and fluid L at a frequency larger than a frequency at which the fluid column in the orifice 408 so that the vibration damper apparatus 400 yields a reduction in the degree of transmission of vibrations in the specific range of high frequencies. Because the gas G moves between the second fluid chambers 410b and the third fluid chamber 450 so as to develop uniform distribution of pressure over the fluid L, it functions as a sort of flexible diaphragm.

Vibration Attenuation

Because the gas G, moving between the second and third fluid chambers 410b and 450 through the orifice 440, the degree of transmission of vibrations in a specific range of low frequencies is diminished, i.e. the expansive stiffness of the first fluid chamber 410a is reduced, so that the vibration damper apparatus 400 yields an enhanced degree of vibration attenuation and, consequently, an improvement of vibration control function.

Figure 4:
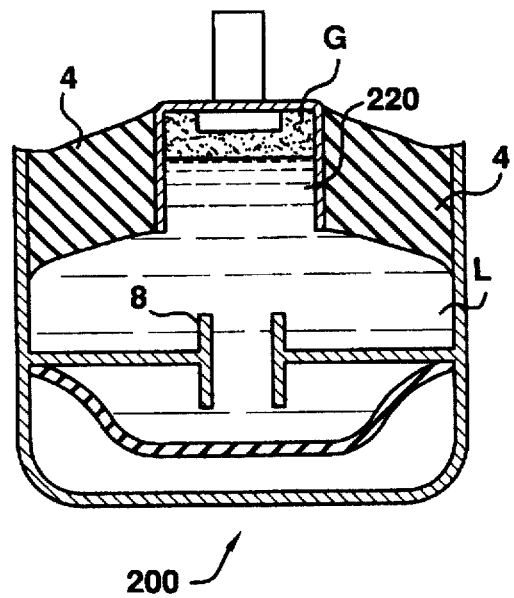
FIG. 4 is a cross-sectional view of a simplified model of the vibration damper apparatus of FIG. 2A.
Figure 5:
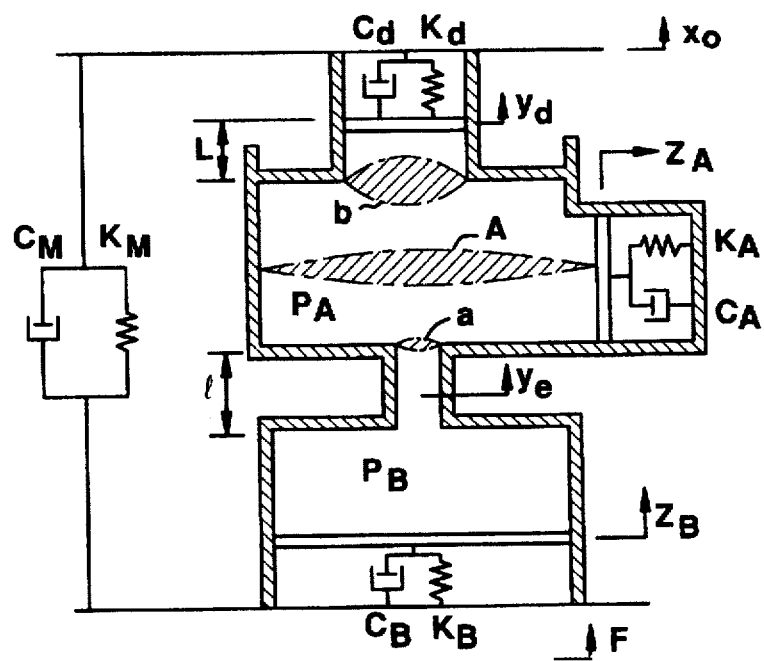
FIG. 5 is a circuit diagram equivalent to the simplified model of FIG. 4.
Figure 21:
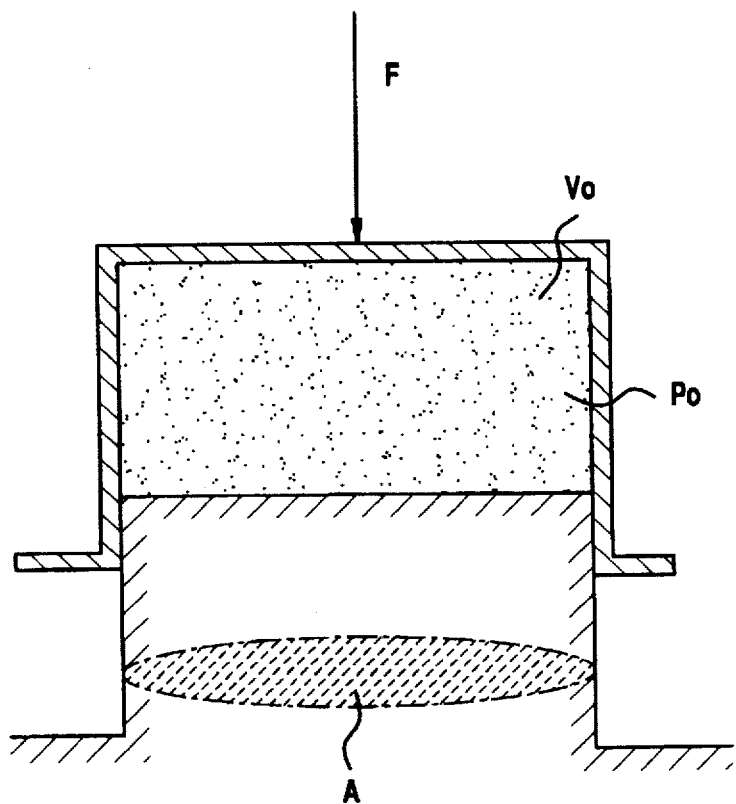
FIG. 21 is an illustration showing a modeled air spring.

For the purpose of providing an understanding of the principle of the vibration damper apparatus shown in FIG. 2A, reference is made to FIGS. 4, 5 and 21. FIGS. 4 and 5 show a theoretical model of the vibration damper apparatus shown in FIGS. 2A and 2B and an equivalent circuit of the theoretical model, respectively. FIG. 21 shows a theoretical model of an air spring, in which reference signs $V_O$, $P_O$ and A indicate the volume of fluid, the pressure of fluid and the cross-sectional area of a fluid chamber.

The mass of fluid Md in the air device and the mass of fluid Me in the fluid chambers are defined as follows, respectively:

$$\left. \begin{array}{l} Md = \rho \cdot b \cdot L \\ Me = \rho \cdot a \cdot l \end{array} \right\} \quad (I)$$

where $\rho$ is the density of the fluid;

L is the length of the air device; and l is the length of the orifice.

The following equations of motion should hold in the equivalent circuit shown in FIG. 5:

$$m_d \cdot \ddot{y}_d + c_d (\dot{y}_d - \dot{x}_o) + k_d ((y_d - x_o) - b \cdot P_A = 0$$

$$m_e \cdot \ddot{y}_e + c_e \cdot \dot{y}_e + a(P_A - P_B) = 0$$

$$C_A \cdot \dot{Z}_A + K_A \cdot Z_A - A \cdot P_A = 0$$

$$C_B \cdot \dot{Z}_B + K_B \cdot Z_B - A \cdot P_B = 0$$

$$A \cdot \dot{Z}_A + A \cdot \dot{x}_o + b(\dot{y}_d - \dot{x}_o) - a \cdot \dot{y}_e = 0$$

$$a \cdot \dot{y}_e - A \cdot \dot{Z}_B = 0$$

where $y_d$ is the deflection of the air device;

$c_d$ is the attenuation factor of the air device;

$x_o$ is the deflection of the third fluid chamber;

$k_d$ is the spring constant of the air device;

b is the cross-sectional area of the air device;

$P_A$ is the fluid pressure in the first fluid chamber;

$y_e$ is the deflection of a fluid column in the orifice;

$c_e$ is the attenuation factor of a fluid column in the orifice;

a is the cross-sectional area of the orifice;

$P_B$ is the fluid pressure in the second fluid chamber;

$C_A$ is the attenuation factor of the elastic rubber pad;

$Z_A$ is the deflection of the elastic rubber pad;

$K_A$ is the spring constant of the elastic rubber pad;

A is the cross-sectional area of the first fluid chamber;

$C_B$ is the attenuation factor of the diaphragm;

$\dot{Z}_B$ is the deflection of the diaphragm; and $K_B$ is the spring constant of the diaphragm;

In FIG. 5, reference signs $C_M$, $K_M$ and F indicate the attenuation factor of the vibration damper apparatus 200, the spring constant of the vibration damper apparatus 200, and the force acting on the vibration damper apparatus 200, respectively.

The equivalent mass $M_D$ and $M_E$ with regard to the model of air spring shown in FIG. 21 are expressed as follows:

$$M_D = (A/b)^2 \cdot m_d \brace M_E = (A/a)^2 \cdot m_e \quad (II)$$

The equivalent attenuation factors $C_D$ and $C_E$ with regard to the model of air spring shown in FIG. 21 are expressed as follows:

$$C_D = (A/b)^2 \cdot C_d \brace C_E = (A/a)^2 \cdot C_e \quad (III)$$

The spring constant K of the model of air spring shown in FIG. 21 is defined as follows:

$$K = \gamma \cdot P_o / V_o \cdot A^2$$

where r is the polytropic exponent.

Consequently, the equivalent spring constant with regard to the model of air spring is expressed as follows:

$$K_D = (A/b)^2 \cdot k_d - (A/b)^2 \cdot (\gamma \cdot P_o \cdot A^2 / V_o)$$

The equivalent displacement $Y_D$ and $Y_E$ with regard to the model of air sprint are expressed as follows:

$$Y_D = (b/A) \cdot y_d \brace Y_E = (a/A) \cdot y_e \quad (IV)$$

By solving the equation of motion by the Laplace transform with the use of the above equations, the following equivalent equations are obtained:

$$[M_D \cdot S^2 + (C_D + C_A) \cdot S + K_D + K_A] \cdot Y_D - (C_A \cdot S + K_A) \cdot Y_E = [b/A \cdot (C_D \cdot S + K_D) - (A-b)/A \cdot (C_A \cdot S + K_A)] \cdot x_o$$

$$[M_E \cdot S^2 + (C_E + C_A + C_B) \cdot S + K_A + K_B] \cdot Y_E - (C_A \cdot S + K_A) \cdot Y_D = [(A-b) \cdot (C_A \cdot S + K_A)/A] \cdot x_o$$

where

S is the Laplace operator.

Figure 6:
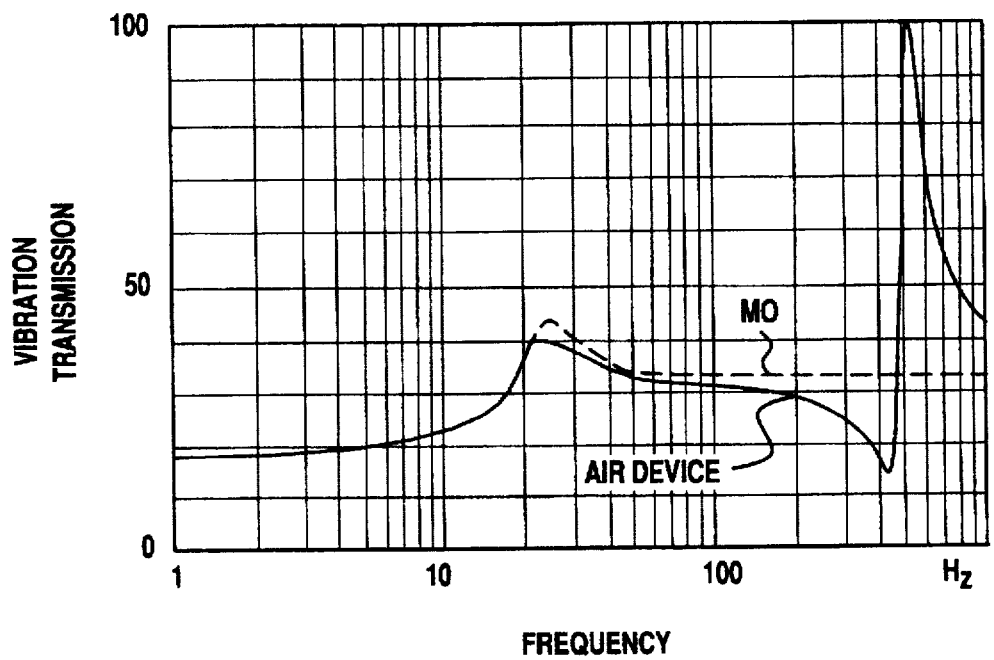
FIG. 6 is a graph showing the vibration transmission characteristic of the simplified model of FIG. 4.
Figure 7:
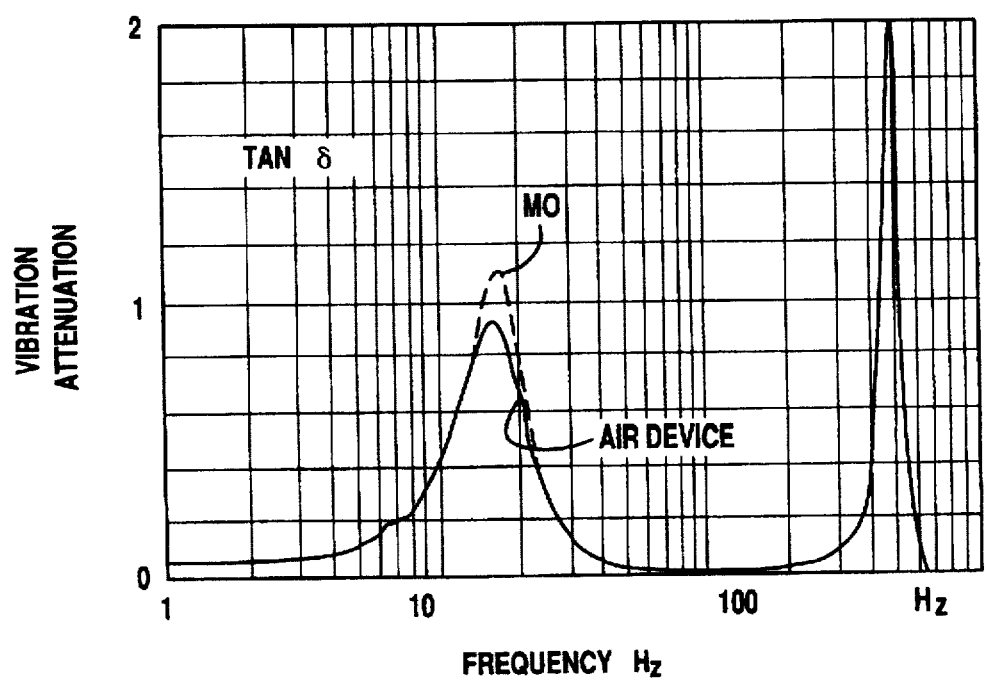
FIG. 7 is a graph showing the vibration attenuation characteristic of the simplified model of FIG. 4.

As shown in FIGS. 6 and 7, the resultant vibration transmission and the resultant vibration attenuation are obtained, respectively, for various parameters of the model of the vibration damper apparatus 200 shown in FIG. 5 which are set as indicated in the following Table I:

TABLE I

| Parameter | Air Device | 2nd Generation Mount (2nd MO) |
|---|---|---|
| Support KM | 17.60 | 17.60 |
| Support KM | 0 | 0 |
| Expansion KA | 40.0 | 15.0 |
| Expansion CA | 0 | 0 |
| Dia. FKA | 0.5 | 0.5 |
| Dia. FCB | 0 | 0 |
| Area A | | 1200.0 |
| Area a | 20.0 | 20.0 |

TABLE I-continued

| Parameter | Air Device | 2nd Generation Mount (2nd MO) |
|---|---|---|
| Length l | 130.0 | 130 |
| Attenuation CE | 0.07 | 0.07 |
| Area B | 500.0 | 0 |
| Length L | 20.0 | 0 |
| Attenuation CD | 0 | 0 |
| OL Resonance | 19.4 | 20.26 |
| OL Mass | 9.36 | 9.36 |
| DV Resonance | 511.99 | 0 |
| DV Mass | 0.06 | 0 |
| DV Spring | 2083.0 | % |

When the vibration damper apparatus 200 shown in FIG. 2A contains a gas G of 1 (one) cc, the resonant frequency of a fluid column in the third fluid chamber 220 functioning as an air device is higher than that of a fluid column in the orifice 8. The fluid column resonates responsive to vibrations in the specific range of frequencies, so that the vibration damper apparatus 200 provides a reduced degree of transmission Kt or |F/xo| for vibrations at specific frequencies, for instance approximately 400 Hz. Together, the vibration damper apparatus 200 provides a reduced degree of transmission Kt or |F/xo| for vibrations in a specific range of frequencies, for instance approximately from 10 to 20 Hz, which is less than the resonant frequency, due to the contraction of the gas G in the third fluid chamber 220. Accordingly, as apparent in FIG. 7, the vibration damper apparatus 200 provides peaks of vibration attenuation Tan δ in the ranger of frequencies from 10 to 20 Hz and at approximately 400 Hz.

Figure 8:
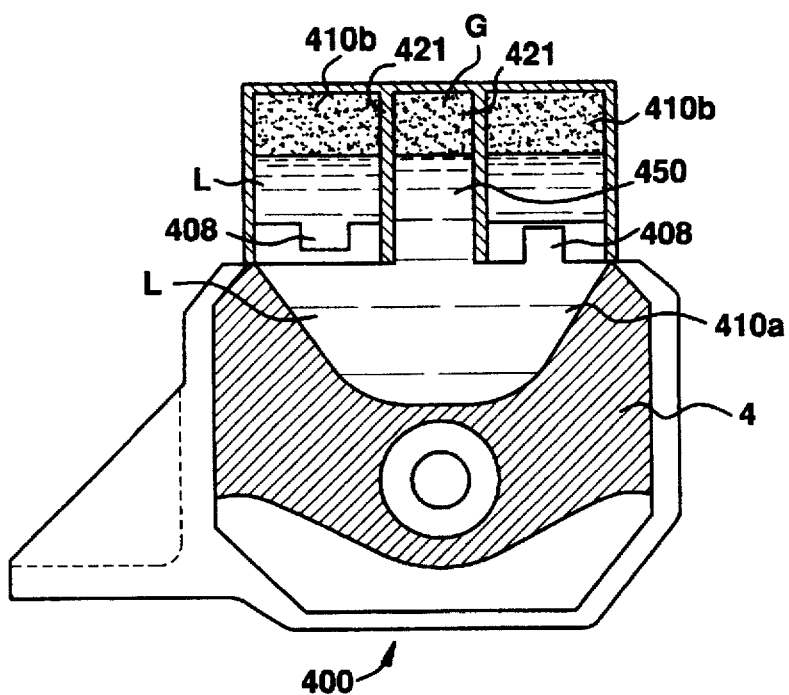
FIG. 8 is a cross-sectional view of a simplified model of the vibration damper apparatus of FIG. 3A.
Figure 9:
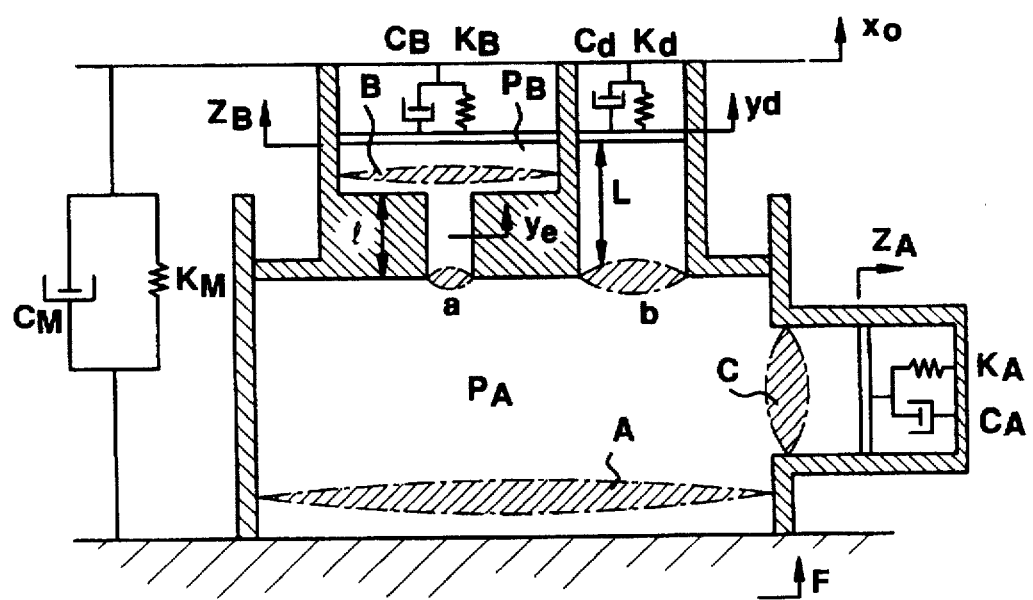
FIG. 9 is a circuit diagram equivalent to the simplified model of FIG. 8.

Reference to FIGS. 8 and 9 showing a theoretical model of the vibration damper apparatus shown in FIGS. 3A and 3B and an equivalent circuit of the theoretical model, respectively, the equations of motion are expressed with use of the equations (I) for the equivalent circuit shown in FIG. 9 as follows:

$$m_d \cdot \ddot{y}_d + c_d (\dot{y}_d - \dot{x}_o) + k_d (y_d - x_o) - b \cdot P_A = 0$$

$$m_e \cdot \ddot{y}_e + c_e \cdot (\dot{y}_e - \dot{x}_o) - a(P_A - P_B) = 0$$

$$C_A \cdot \dot{Z}_A + K_A \cdot Z_A - C \cdot P_A = 0$$

$$C_B \cdot (\dot{Z}_B - \dot{x}_o) + K_B \cdot (Z_B - x_o) - B \cdot P_B = 0$$

$$C \cdot \dot{Z}_A + A \cdot \dot{x}_o + b(\dot{y}_d - \dot{x}_o) + a \cdot (\dot{y}_e - \dot{x}_o) = 0$$

$$a \cdot (\dot{y}_e - \dot{x}_o) - B \cdot (\dot{Z}_B - \dot{x}_o) = 0$$

where $y_d$ is the deflection of the air device;

$c_d$ is the attenuation factor of the air device;

$x_o$ is the deflection of the third fluid chamber;

$k_d$ is the spring constant of the air device;

b is the cross-sectional area of the air device;

$P_A$ is the fluid pressure in the first fluid chamber;

$y_e$ is the deflection of a fluid column in the orifice;

$c_e$ is the attenuation factor of a fluid column in the orifice;

a is the cross-sectional area of the orifice;

$P_B$ is the fluid pressure in the second fluid chamber;

$C_A$ is the attenuation factor of the elastic rubber pad;

$\dot{Z}_A$ is the deflection of the elastic rubber pad;

$K_A$ is the spring constant of the elastic rubber pad;

A is the cross-sectional area of the first fluid chamber;

C is the cross-sectional area of the elastic rubber pad;

$C_B$ is the attenuation factor of the fluid chamber serving as a diaphragm;

$Z_B$ is the displacement of the fluid chamber serving as a diaphragm;

$K_B$ is the spring constant of the fluid chamber serving as a diaphragm;

B is the cross-sectional area of the fluid chamber serving as a diaphragm;

Since the equivalent mass $M_D$ and $M_E$ and equivalent attenuation $C_D$ and $C_E$ with regard to the model are expressed by the equations (II) and (III), respectively, the equivalent spring constant with regard to the model of air spring is expressed as follows:

$$K_D = (A/b)^2 \cdot k_d - (A/b)^2 \cdot (\gamma \cdot P_0 \cdot b^2 / V_D) - \gamma \cdot P_0 \cdot A^2 / V_D$$

Further, since the equivalent displacement $Y_D$ and $Y_E$ with regard to the model of air spring are expressed by the equations (IV), the spring constant of the equivalent diaphragm of the model is expressed as follows:

$$K_B = \gamma \cdot P_0 \cdot A^2 / V_B$$

By solving the equation of motion by the Laplace transform with the use of the above equations, the following equations are obtained:

$$[M_D \cdot S^2 + (C_D + C_A) \cdot S + K_D + K_A] \cdot Y_D + (C_A \cdot S + K_A) \cdot Y_E = [b \cdot (C_D \cdot S + K_D)/A - (A-a-b) \cdot (C_A \cdot S + K_A)/A] \cdot x_o$$

$$[M_E \cdot S^2 + (C_E + C_A + C_B) \cdot S + K_A + K_B] \cdot Y_E + (C_A \cdot S + K_A) \cdot Y_D = [a \cdot \{(C_E + C_B) \cdot S + K_B\}/A - (A-a-b) \cdot (C_A \cdot S + K_A)/A] \cdot x_o$$

$$P_A = -(C_A \cdot S + K_A)/A \cdot [Y_D + Y_E + (A-a-a) \cdot x_o/A]$$

$$P_B = -(C_A \cdot S + K_B)/A \cdot [Y_E - a \cdot x_o/A]$$

$$F = (C_M \cdot S + K_M) \cdot x_o - A \cdot P_A$$

The natural frequencies $\omega_E$ and $\omega_D$ of a fluid column in the orifice and the air device are expressed, respectively, as follows:

$$\omega_E = [K_A \cdot K_D / \{(K_A + K_D) + K_B\} / M_B]^{1/2} / 2\pi$$

$$\omega_D = [(K_A + K_D)/M_D]^{1/2} / 2\pi$$

Figure 10:
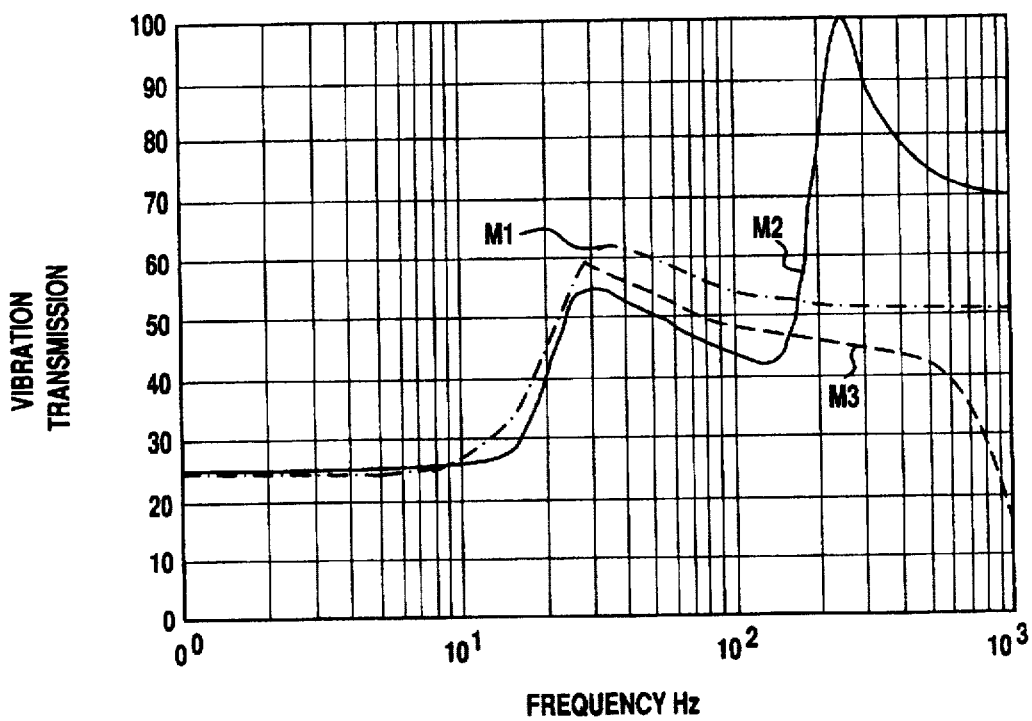
FIG. 10 is a graph showing the vibration transmission characteristic of the simplified model of vibration damper apparatus of FIG. 8.
Figure 11:
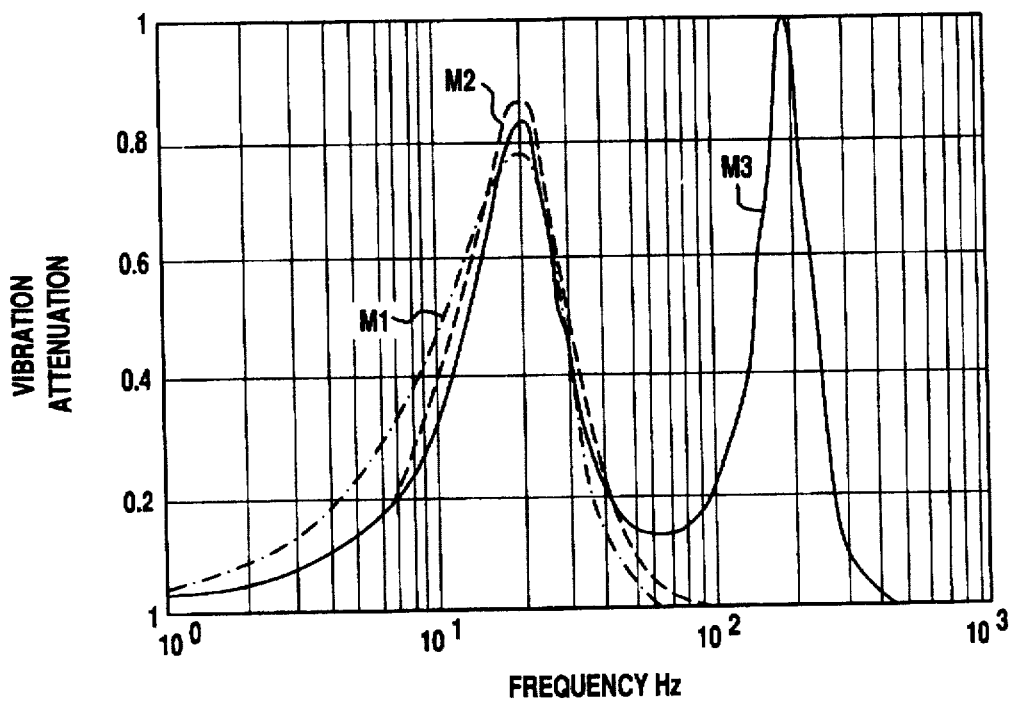
FIG. 11 is a graph showing the vibration attenuation characteristic of the simplified model of vibration damper apparatus of FIG. 8.

As shown in FIGS. 10 and 11, the resultant vibration transmission factor and the resultant vibration attenuation factor are obtained, respectively, for various parameters of the model of the vibration damper apparatus 400 shown in FIG. 8 as indicated in the following Table II:

TABLE II

| Parameter | Air Device(M2) | Dynamic Damper (M1) | No Air Device(M3) |
|---|---|---|---|
| Support KM | 24.0 | 24.0 | 24.0 |
| Support KM | 0 | 0 | 0 |
| Expansion KA | 50.0 | 28.0 | 50.0 |
| Expansion CA | 0 | 0 | 0 |
| Area A | 1200.0 | 1200.0 | 1200.0 |
| Area a | 20.0 | 20.0 | 20.0 |
| Length 1 | 130.0 | 130.0 | 130.0 |
| Air cc. | 20.0 | 100.0 | 20.0 |
| Attenuation CB | 0.1 | 0.15 | 0.1 |
| Attenuation CE | 0.01 | 0.01 | 0.01 |
| Area b | 100.0 | 0 | 100.0 |
| Length L | 35.0 | 0 | 1.0 |

TABLE II-continued

| Parameter | Air Device(M2) | Dynamic Damper (M1) | No Air Device(M3) |
|---|---|---|---|
| Air cc. | 0.5 | 0 | 0.5 |
| Attenuation CD | 0.03 | 0 | 0 |
| OL Resonance | 25.1 | 27.31 | 25.1 |
| OL Mass | 9.36 | 9.36 | 9.36 |
| OL Spring | 1.04 | 0.21 | 1.04 |
| DV Resonance | 212.46 | 0 | 1256.96 |
| DV Mass | 0.5 | 0 | 0.01 |
| DV Spring | 41.65 | ∞ | 41.65 |

In FIGS. 10 and 11, a curve M2 show the characteristics of the vibration damper apparatus 400 having the air device shown in FIGS. 3A and 3B, and curves M1 and M3 show the characteristics of vibration damper apparatuses having a dynamic damper in place of an air damper and no damper means, respectively. When the vibration damper apparatus 400 contains a gas G of 100 cc, a fluid column in the third fluid chamber 450 functioning as an air device causes resonant vibrations at specific high frequencies due to the contraction property. Because the resonant frequency of the fluid column in the third fluid chamber 450 is set higher than that of a fluid column in the orifice, the vibration damper apparatus 400 provides a reduced degree of transmission Kt or |F/xo| for vibrations at the specific frequencies, for instance approximately 400 Hz. Together, the gas G moves between the first fluid chambers 420 and 430, so that the vibration damper apparatus 400 provides a reduced degree of transmission Kt or |F/xo| for vibrations in a specific range of frequencies, for instance approximately from 100 to 200 Hz, which is less than the resonant frequency, due to the contraction of the gas G in the third fluid chamber 450. Accordingly, as apparent in FIG. 11, the vibration damper apparatus 400 provides peaks of vibration attenuation Tan δ in the ranger of frequencies from 100 to 200 Hz and at approximately 400 Hz.

Figure 12:
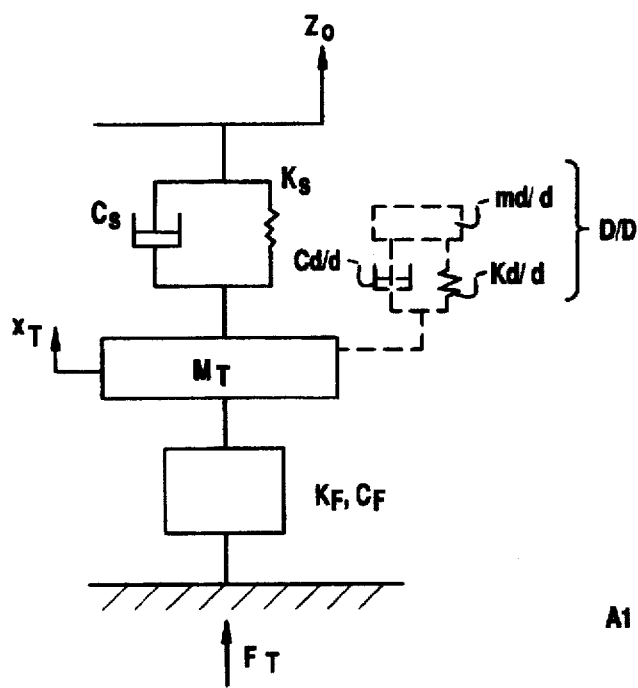
FIG. 12 is a circuit diagram equivalent to a vibration damper apparatus, similar to the vibration damper apparatus, which has a dynamic damper (D/D) in place of the air damper.
Figure 14:
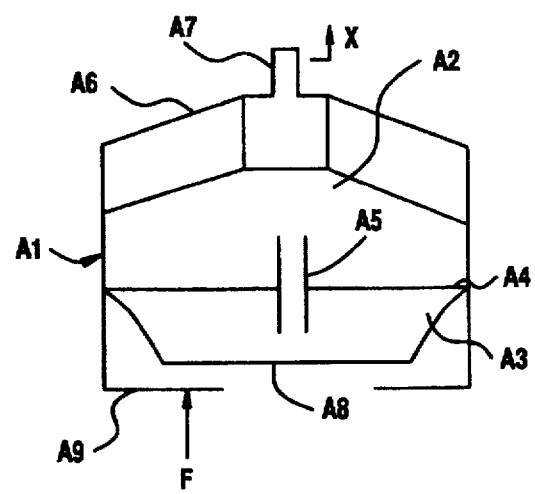
FIG. 14 is a schematic illustration showing a prior art vibration damper apparatus of first generation.

In order to make a comparative study of the vibration damper apparatus 400, reference is made to FIG. 12 diagrammatically showing an equivalent model of a fluid type of vibration damper apparatus which has the basically same structure as the vibration damper apparatus 400 and is, however, provided with a dynamic damper D/D in place of the air device. In FIG. 12, reference signs $K_S$, $C_S$, $M_T$, $m_{d/d}$, $k_{d/d}$, $C_{d/d}$, $X_T$, $F_T$ and $Z_O$ indicate, respectively, the spring constant of a rubber member for connecting the fluid vibration damper apparatus and the dynamic damper, the attenuation factor of the connecting rubber member, the mass of the connecting rubber member, the mass of the dynamic damper, the spring constant of the dynamic damper, the attenuation factor of the dynamic damper, the displacement of the fluid vibration damper apparatus, the force acting on the fluid vibration damper apparatus, and the deformation of the connecting rubber member.

Equivalent equations are obtained by solving the equation of motion relating to the equivalent model of FIG. 12 by the Laplace transform with use of the equivalent spring constant $K_F$ and the equivalent attenuation factor $C_F$ indicated below.

$$K_F = \mathrm{Re}(F/xo)$$

$$C_F = \mathrm{Im}(F/xo)/\omega$$

Figure 13:
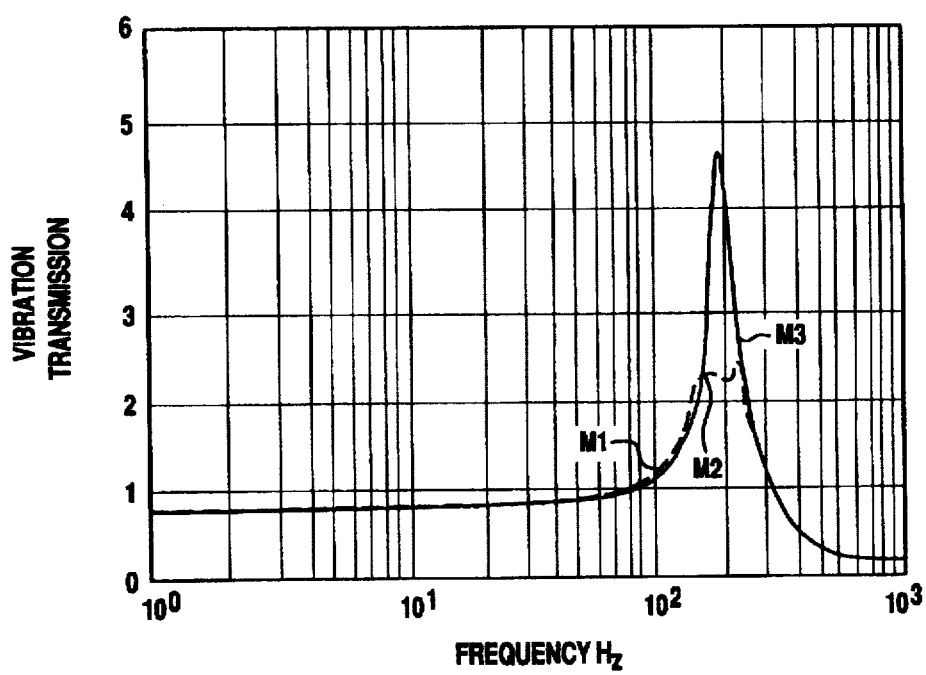
FIG. 13 is a graph showing the vibration attenuation characteristic of the equivalent circuit of FIG. 12.
Figure 15:
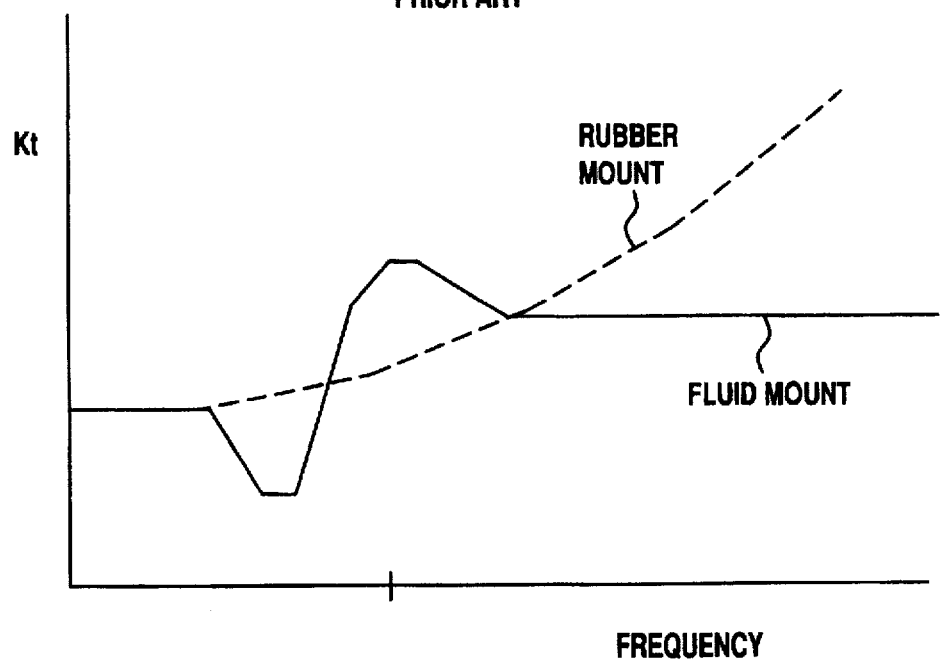
FIG. 15 is a graph showing the vibration transmission characteristic of the prior art vibration damper apparatus of FIG. 14.
Figure 16:
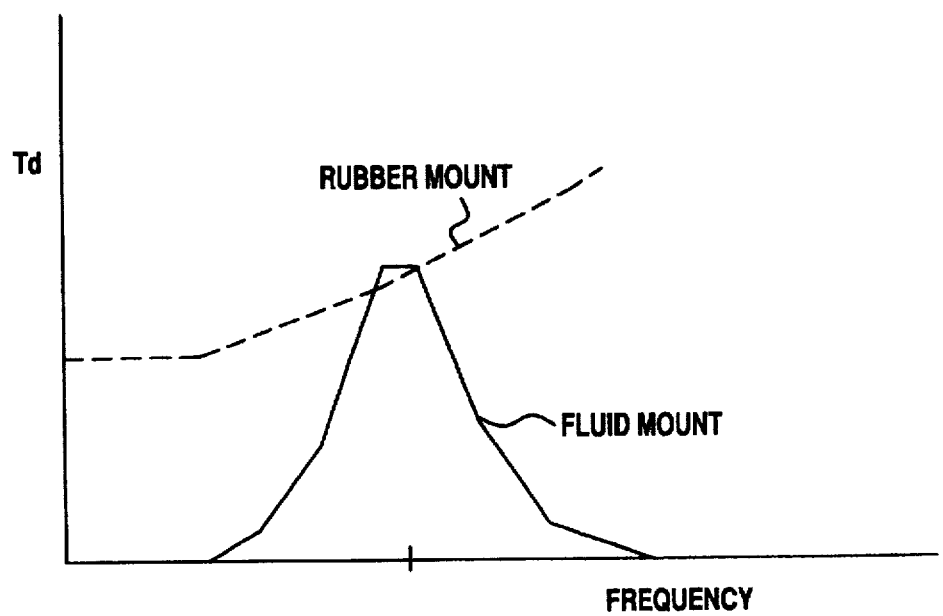
FIG. 16 is a graph showing the vibration attenuation characteristic of the prior art vibration damper apparatus of FIG. 14.
Figure 17:
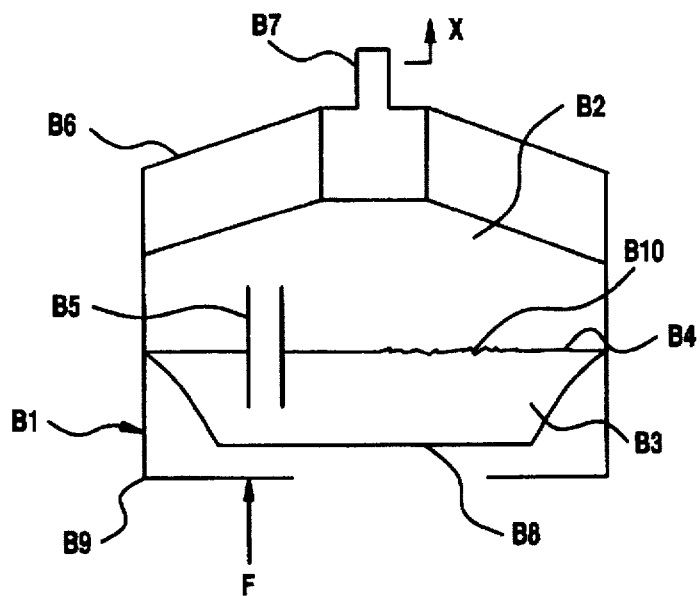
FIG. 17 is a schematic illustration showing a prior art vibration damper apparatus of second generation.
Figure 18:
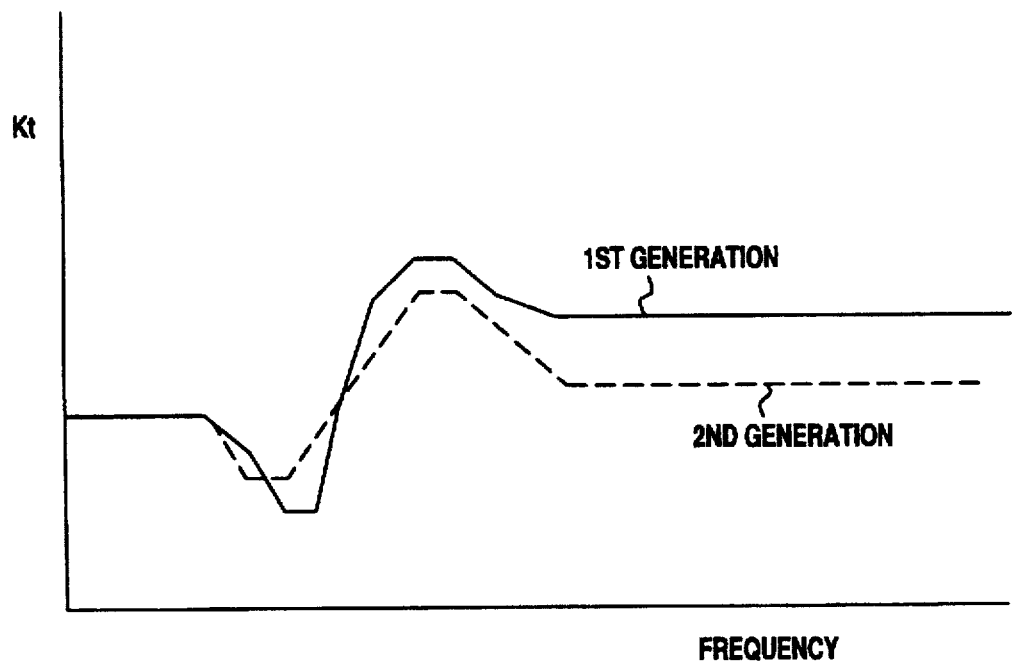
FIG. 18 is a graph showing the vibration transmission characteristic of the prior art vibration damper apparatus of FIG. 17.
Figure 19:
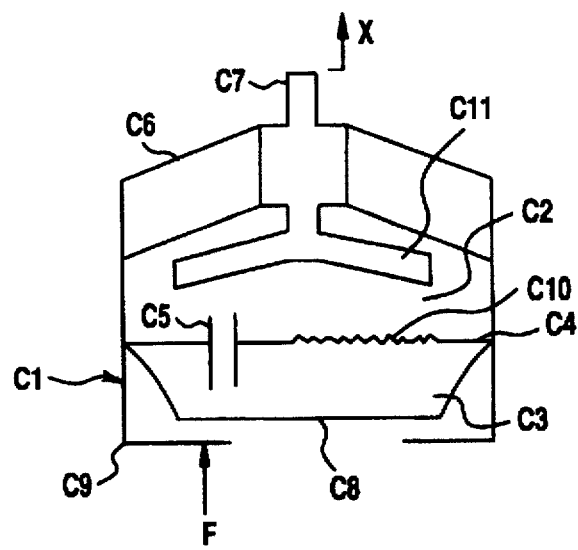
FIG. 19 is a schematic illustration showing a prior art vibration damper apparatus of third generation.
Figure 20:
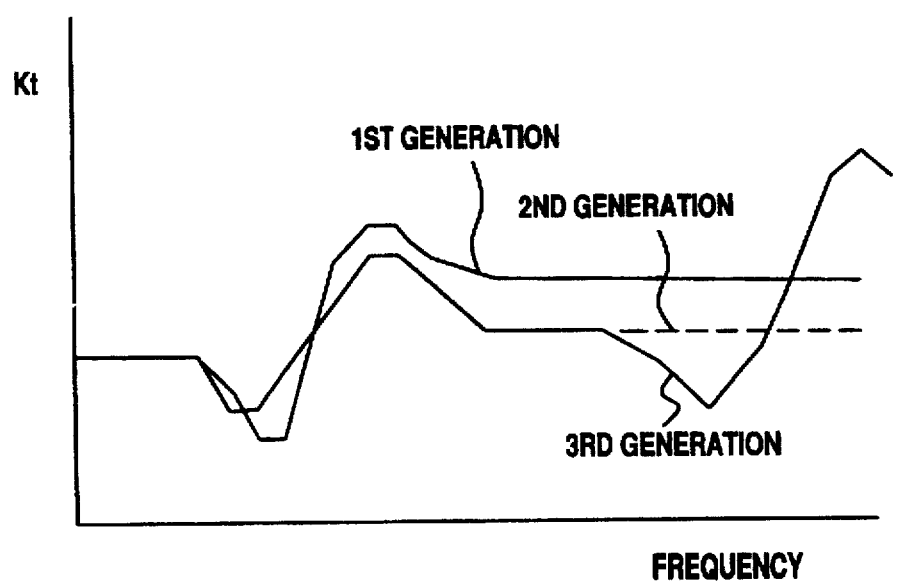
FIG. 20 is a graph showing the vibration transmission characteristic of the prior art vibration damper apparatus of FIG. 19.

As shown in FIG. 13, the resultant vibration transmission is obtained for various parameters of the model of the vibration damper apparatus shown in FIG. 12 as indicated in the following Table III:

TABLE III

| Parameter | Air Device(M2) | Dynamic Damper (M1) | No Air Device(M3) |
| --- | --- | --- | --- |
| Exciting Ks | 200.0 | 200.0 | 200.0 |
| Exciting Cs | 0.03 | 0.03 | 0.03 |
| Mass MT | 1.50 | 1.50 | 1.50 |
| Dm m | 0.0 | 0.2 | 0.0 |
| Dm K | 0.0 | 25.0 | 0.0 |
| Dm C | 0.0 | 0.01 | 0.0 |
| DD Resonance | 0.0 | 176.15 | 0.0 |
| DV Resonance | 212.46 | 0.0 | 1256.96 |
| DV Mass | 0.5 | 0.0 | 0.01 |
| DV Spring | 41.65 | ∞ | 41.65 |

As apparent from FIG. 13, the vibration damper apparatus (M2) shown in FIG. 3A is very close in the characteristic of vibration transmission close to the vibration damper apparatus with a dynamic damper (M1). This indicates that the replacement of the air device with a dynamic damper does not show changes in effects.

Generally, a fluid vibration damper apparatus causes a change in flowing pattern of fluid according to an occurrence of resonance of a fluid column in an orifice and the amplitude and frequency of external force which suffers from viscosity resistance of the fluid. For instance, if external force is applied slowly to the vibration damper apparatus, the fluid is less affected in flowing pattern and flows from a high pressure side to a low pressure side through the orifice. However, if external force is applied at frequencies higher than the resonant frequency of the fluid column, the fluid does not flow through the orifice almost at all. Accordingly, the fundamental difference of the fluid vibration damper apparatus of the present invention from the prior art vibration damper apparatus such as described in Japanese Unexamined Patent Publications Nos. 59-166737 and 60-139507 is in that, when external force is applied slowly, the prior art vibration damper apparatus contains a gas filled in a chamber to which the fluid flows in whereas the vibration damper apparatus contains a gas filled in a chamber from which the fluid flows out.

Making a comparison between these vibration damper apparatuses in their functional aspects, the phenomenon that fluid flows in and out of the air device occurs due to differences in spring constant between expansive members. In other words, fluid flows or moves from an expansive member having a large spring constant to an expansive member having a small spring constant. Because the orifice is blocked in a range of high frequencies in which noises are generated, it becomes easy to transmit noises with an increase in spring constant of the expansive member. Because the vibration damper apparatus of the present invention contains a gas in one of fluid chambers which has an equivalent spring constant larger than another chamber, it provides great noise reduction effect by declining the spring constant of the one chamber. Contrary, because the prior art vibration damper apparatus contains a gas in one of fluid chambers which has an equivalent spring constant smaller than another chamber, it has less noise reduction effect.

As compared with the prior art vibration damper apparatus described in Japanese Unexamined Utility Model Publications No. 4-97136, another significant difference in structure of the vibration damper apparatus of the present invention is that the third fluid chamber or air chamber is not separated from the first fluid chamber by an elastic rubber membrane. In other words, the prior art vibration damper apparatus contains a gas in order to optimize the spring constant of the elastic rubber membrane. Accordingly, what has direct effect to vibration attenuation and vibration transmission is the elastic rubber membrane. This is proved from a description in the publication that the air chamber may open to the atmosphere or be isolated from the atmosphere. Contrary to the vibration damper apparatus of the present invention in which the gas, the amount of which is determined depending upon the resonant frequency of a fluid column in the third fluid chamber, acts directly on the fluid column so as to reduce the expansive stiffness of the first fluid chamber, i.e. to decline the degree of vibration transmission, thereby enhancing the noise reduction effect, the prior art vibration damper apparatus reduces the expansive stiffness of the air chamber by gas pressure in the air chamber and the flexibility of the elastic rubber membrane and does not make the gas act directly on the fluid in the fluid chamber, so as to have less noise reduction effect.

In confining a gas in the vibration damper apparatus of the present invention, after closing up the fluid container airtightly, fluid is injected into the fluid container. Subsequently, after degassing the fluid in the fluid container, a predetermined amount of a gas, such as air and an inert gas, is injected and confined in the fluid container. The amount of a gas is predetermined to be necessary to absorb or attenuate vibrations in a predetermined range of high frequencies. Finally, the vibration damper apparatus is contracted and sealed so as to be placed under internal pressure.

With the vibration damper apparatus of the present invention, the gas in the third fluid chamber serves as an elastic rubber membrane used in the prior art vibration damper apparatus which in turn governs the expansive stiffness and cooperates with resonant vibrations of a fluid column so as to provide a reduction in the degree of transmission of vibrations in a specific range of frequencies. Furthermore, the compressive characteristics of confined gas is substitutive for a diaphragm, reducing the number of parts of the vibration damper apparatus and, consequently, realizes low costs. Together, the quantities of the confined gas governs the dynamic characteristics of the vibration damper apparatus, it is easy to design and adapt the vibration damper apparatus so as to be suitable for any specific model of engines and vehicles.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A fluid type of vibration damper apparatus, containing fluid in a generally rigid container closed up tightly by walls including at least an elastic top wall to which a subject body is connected, for damping and absorbing vibrations of the subject body, said vibration damper apparatus comprising:

a rigid partition wall for dividing said fluid container into a first fluid chamber defined by said elastic top wall and a second fluid chamber, said rigid partition wall being formed with an orifice which allows said fluid to move between said first fluid chamber and said second fluid chamber due to deformation of said elastic top wall;

a rigid inner wall for forming a third fluid chamber opening to said first fluid chamber to provide a fluid column directly on said fluid in said first fluid chamber, an opening between said first and said third fluid chambers having a cross-sectional area larger than a cross-sectional area of said orifice; and a predetermined quantity of gas confined in said third fluid chamber so as to be in direct contact with said fluid.

2. A fluid type of vibration damper apparatus as defined in claim 1, and further comprising lining means for air tightly covering said elastic top wall.

3. A fluid type of vibration damper apparatus as defined in claim 1, wherein said gas is air.

4. A fluid type of vibration damper apparatus as defined in claim 1, wherein said gas is an inert gas having no chemical reaction on said elastic top wall.

5. A fluid type of vibration damper apparatus as defined in claim 1, wherein said predetermined quantity of said gas is determined so as to reduce transmission of vibrations at frequencies higher than a predetermined frequency of said subject body.

6. A fluid type of vibration damper apparatus as defined in claim 1, wherein said partition wall is rigid.

7. A fluid type of vibration damper apparatus as defined in claim 1, wherein said first fluid chamber is disposed above said second fluid chamber.

8. A fluid type of vibration damper apparatus as defined in claim 7, wherein said fluid container includes an elastic bottom wall by which said second fluid chamber is defined below said first fluid chamber.

9. A fluid type of vibration damper apparatus as defined in claim 7, wherein each of said elastic top wall and said elastic bottom wall is deformable so as to function as a spring responding to changes in internal pressure in said fluid container and said elastic top wall has an equivalent spring constant larger than said elastic bottom wall.

10. A fluid type of vibration damper apparatus as defined in claim 7, wherein said third fluid chamber provides for said fluid column therein a resonant frequency larger than that of said fluid in said orifice.

11. A fluid type of vibration damper apparatus as defined in claim 7, wherein said inner wall comprises a hollow cylindrical member, at least part of said hollow cylindrical member being embedded in said elastic top wall.

12. A fluid type of vibration damper apparatus as defined in claim 1, wherein said second fluid chamber is disposed above said first fluid chamber.

13. A fluid type of vibration damper apparatus as defined in claim 12, wherein said partition wall comprises an outer hollow cylindrical member, at least part of said hollow cylindrical member being embedded in said elastic top wall and said inner wall comprises an inner hollow cylindrical member disposed within said outer hollow cylindrical member so as to form said second fluid chamber between said outer hollow cylindrical member and said inner hollow cylindrical member and said third fluid chamber within said inner hollow cylindrical member.

14. A fluid type of vibration damper apparatus as defined in claim 13, further comprising a predetermined quantity of gas confined in said second fluid chamber so as to be in direct contact with said fluid in said second fluid chamber.

15. A fluid type of vibration damper apparatus as defined in claim 14, wherein said inner wall is formed with an air orifice which allows said gas to move between said second fluid chamber and said third fluid chamber.

16. A fluid type of vibration damper apparatus as defined in claim 15, wherein said gas in said second fluid chamber is larger in quantity that said gas in said third fluid chamber.

17. A fluid type of vibration damper apparatus as defined in claim 16, wherein said partition wall and said inner wall are formed as an integral double walled cylindrical body.

18. A fluid type of vibration damper apparatus as defined in claim 16, wherein said double walled cylindrical body is made of a plastic material.

19. A fluid type of vibration damper apparatus as defined in claim 12, wherein said third fluid chamber provides for said fluid column therein a resonant frequency larger than that of said fluid in said orifice.

20. A fluid type of vibration damper apparatus as defined in claim 12, wherein said inner wall comprises a hollow cylindrical member, at least part of said hollow cylindrical member being embedded in said elastic top wall.

* * * * *